United States Patent [19]

Wada

[11] Patent Number: 5,020,953
[45] Date of Patent: Jun. 4, 1991

[54] LOCK NUT

[75] Inventor: Takeji Wada, Osaka, Japan

[73] Assignee: Fuji Seimitsu Mfg. Co., Ltd., Osaka, Japan

[21] Appl. No.: 172,955

[22] Filed: Mar. 23, 1988

Related U.S. Application Data

[63] Continuation of Ser. No. 71,542, Jul. 7, 1987, abandoned, which is a continuation of Ser. No. 830,240, Feb. 18, 1986, abandoned, which is a continuation of Ser. No. 675,249, Nov. 26, 1984, abandoned, which is a continuation of Ser. No. 303,104, Sep. 17, 1981, abandoned.

[30] Foreign Application Priority Data

Nov. 26, 1980 [JP] Japan ............................ 55-169380[U]

[51] Int. Cl.$^5$ .......................................... F16B 39/284
[52] U.S. Cl. ..................................... 411/247; 411/260; 411/405; 411/432
[58] Field of Search ........................ 411/246–249, 411/254, 260, 226, 301–304, 314, 324, 405, 432

[56] References Cited

U.S. PATENT DOCUMENTS

| | | | |
|---|---|---|---|
| 915,830 | 3/1909 | Craven | 411/260 |
| 1,457,592 | 6/1923 | Murray | 411/165 |
| 2,265,905 | 12/1941 | Hesse et al. | 411/249 |
| 2,295,234 | 9/1942 | Poupitch | 411/247 |
| 2,379,980 | 7/1945 | Miller | 411/247 X |
| 2,432,805 | 12/1947 | Robertson | 411/246 |
| 2,439,253 | 4/1948 | Kendrick | 411/247 |
| 3,003,379 | 10/1961 | Pribitzer | 411/427 X |
| 3,400,742 | 9/1968 | Nakabayashi | 411/260 |
| 4,006,660 | 2/1977 | Yamamoto | 411/405 |
| 4,139,038 | 2/1979 | Haussermann | 411/247 |

FOREIGN PATENT DOCUMENTS

| | | | |
|---|---|---|---|
| 1275078 | 9/1961 | France | 411/249 |
| 1421459 | 11/1965 | France | 411/260 |
| 207702 | 9/1966 | Sweden . | |
| 366379 | 4/1974 | Sweden . | |
| 331926 | 9/1958 | Switzerland | 411/260 |
| 558414 | 1/1944 | United Kingdom | 411/246 |
| 662298 | 12/1951 | United Kingdom | 411/302 |

Primary Examiner—Gary L. Smith
Assistant Examiner—Flemming Saether
Attorney, Agent, or Firm—Cushman, Darby & Cushman

[57] ABSTRACT

A lock nut with a nut and an annular flat plate made of resilient material, the annular flat plate having a circumferential periphery and an arcuate protrusion, wherein the circumferential periphery is secured on one surface of the nut, and the arcuate protrusion is extended inwardly from an inner circumference of the circumferential periphery integrally over one-half or more of the inner circumference so as to contact the threaded surface of a male thread onto which the nut is screwed.

30 Claims, 7 Drawing Sheets

LOCK NUT

This application is a continuation of abandoned application Ser. No. 071,542, filed Jul. 7, 1987, which is a continuation of abandoned application Ser. No. 830,240, filed Feb. 18, 1986, which is a continuation of abandoned application Ser. No. 675,249, filed Nov. 26, 1984, which is a continuation of abandoned application Ser. No. 303,104, filed Sep. 17, 1981.

DETAILED DESCRIPTION OF THE INVENTION

Figure 1:
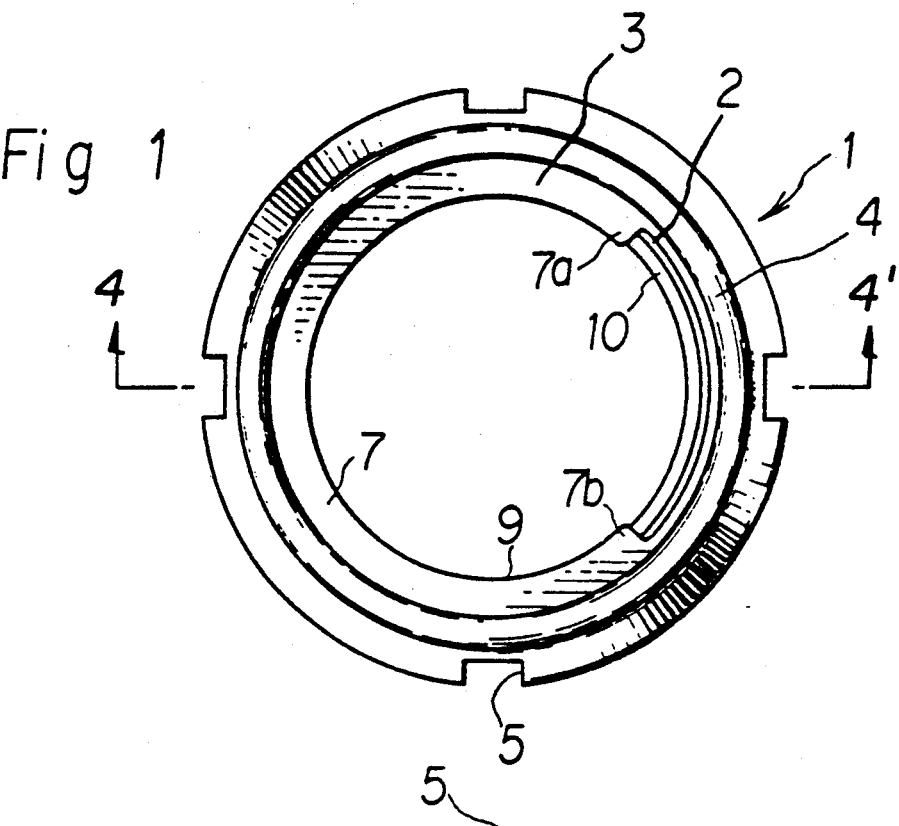

This invention relates, to a lock nut in which an annular flat plate such as made of sheet metal for spring is secured on one surface of a nut and, more specifically, this invention relates to a lock nut for use in setting a rolling bearing mounted on a shaft. Such a lock nut is adapted so that the projection of the annular flat plate firmly contacts the threaded surface of a thread member such as a bolt or a threaded shaft for obtaining satisfactory locking effect of the nut due to frictional action.

It is desired that the locking effect of the nut may not be reduced even after the repeated screw-engagement of the lock nut with the thread member. If plastic deformation is caused to the annular flat plate which is to be in firm contact with the threaded surface of the male thread on a shaft after the repeated screw-engagement of the nut with the male thread on the shaft, desired firm contact with the male thread of the shaft will no more be obtained. Thus, it is required that the, annular flat plate be made of resilient material such as sheet metal for spring.

Lock nuts have hitherto been known in which a plurality of arcuate protrusions are symmetrically formed on an inner periphery of an annular flat plate and they are contacted with the threaded surface of a bolt, each top of the arcuate protrusions defined on a circle concentrical with the circle to which the periphery of the annular flat plate is associated.

In such a lock nut, however, since the symmetrically disposed protrusions contact the threaded surface of the male thread individually, they can not provide so great interferring pressure to the male thread and thus the lock nut is loosened from the bolt when vibrations are exerted on an article to be fastened by the lock nut and the bolt. Particularly, in a case where the lock nut is employed for setting the rolling bearing mounted on a shaft, the lock nut often loosens due to the rotation and the vibration of the shaft.

This invention has been made in view of the foregoing defects and the object thereof is to provide a lock nut for use with a thread member such as a bolt, particularly for use in setting a rolling bearing mounted on a shaft, in which a single protrusion is formed asymmetrically to an annular flat plate so that the protrusion of the flat plate may firmly contact the threaded surface on the thread member such as the bolt or the shaft, and the protrusions intensely bear against the threaded surface of the male thread to thereby surely prevent the nut from loosening.

In the lock nut according to this invention, an annular flat plate secured on one surface of a nut is provided at its inner periphery with an asymmetrical single arcuate protrusion and the protrusion is extended in the form of an arc inwardly over the one-half or more portion of the inner periphery of the annular flat plate integrally, and the annular flat plate secured on one surface of a nut has means for preventing a relative sliding movement of the flat plate to the nut. When the lock nut is screwed to a thread member, the top end of the protrusion of the annular flat plate contacts firmly and continuously the spiral threaded surface corresponding to more than one-half pitch of the male thread on the thread member and exerts intense interfering pressure to the threaded surface, whereby the lock nut can effect reliable locking action. The arcuate protrusion may be defined on a circle concentrical with the circle to which a periphery of the annular flat plate is associated.

Particularly, in the lock nut according to this invention, since the asymmetrical arcuate protrusion of the annular flat plate deforms elastically and screw-engages eccentrically with the male thread of the thread member upon screw engagement of the nut with the thread member, the arcuate protrusion applies an intense interfering pressure on the threaded surface of the male thread and also applies such a force to the nut that the female thread of the nut and the male thread of the thread member firmly contact to each other at each of their flank surfaces.

Figure 2:
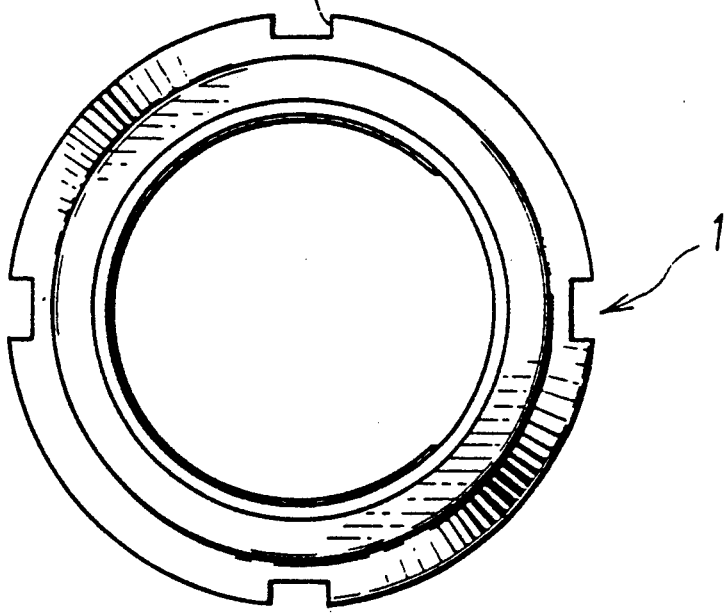
Figure 3:
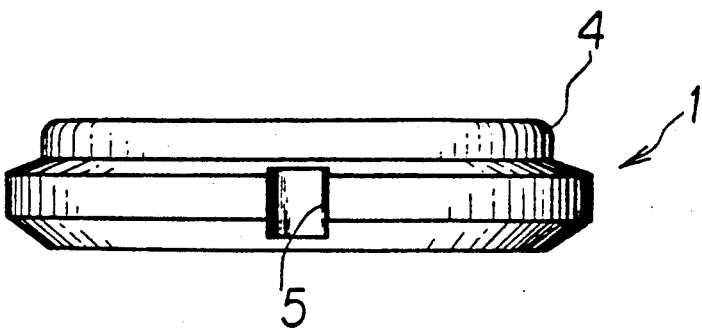
Figure 4:
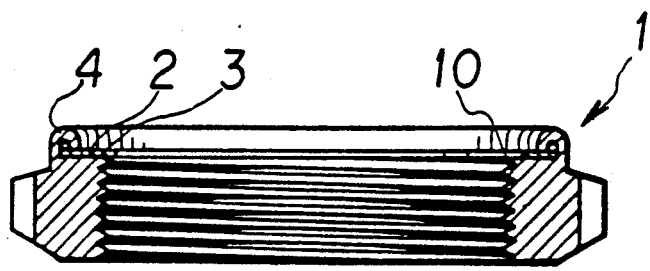
Figure 5:
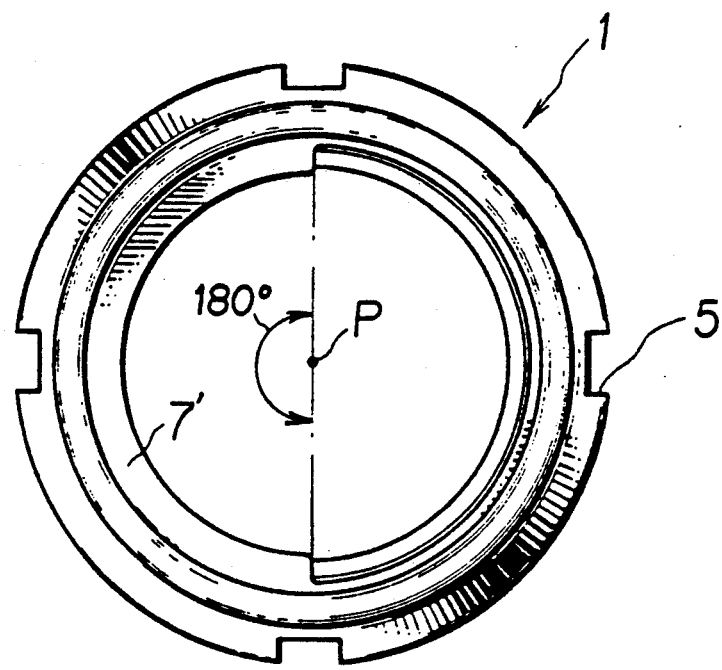
Figure 6:
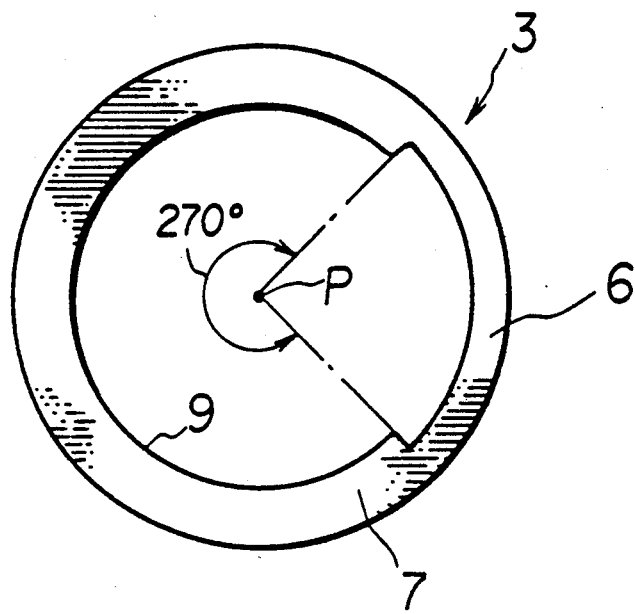
Figure 7:
Figure 8:
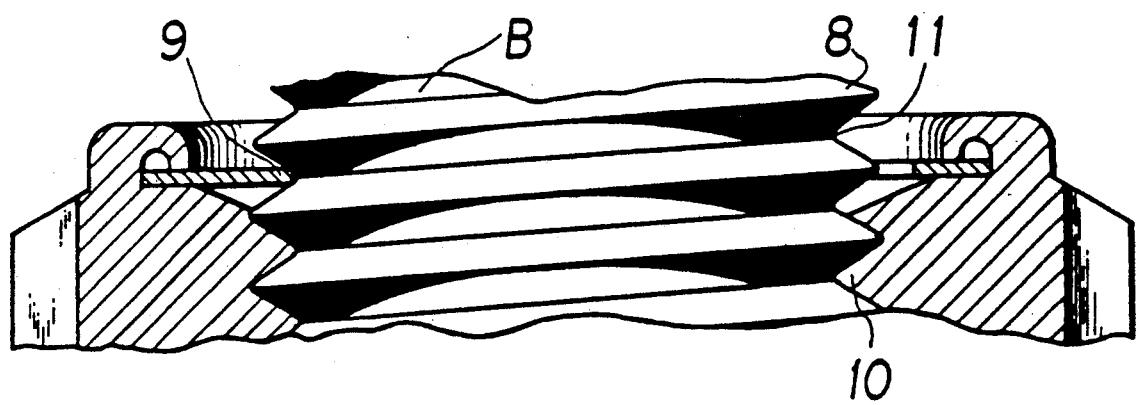
Figure 9:
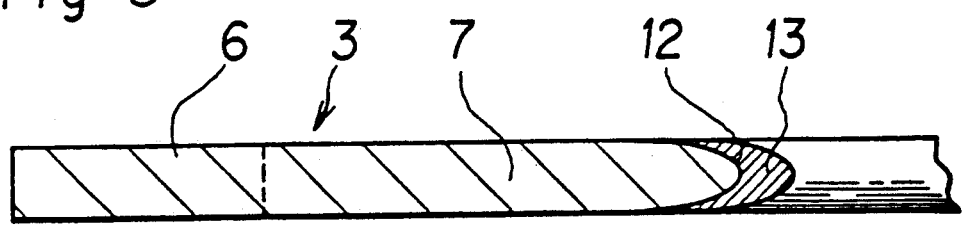
Figure 10:
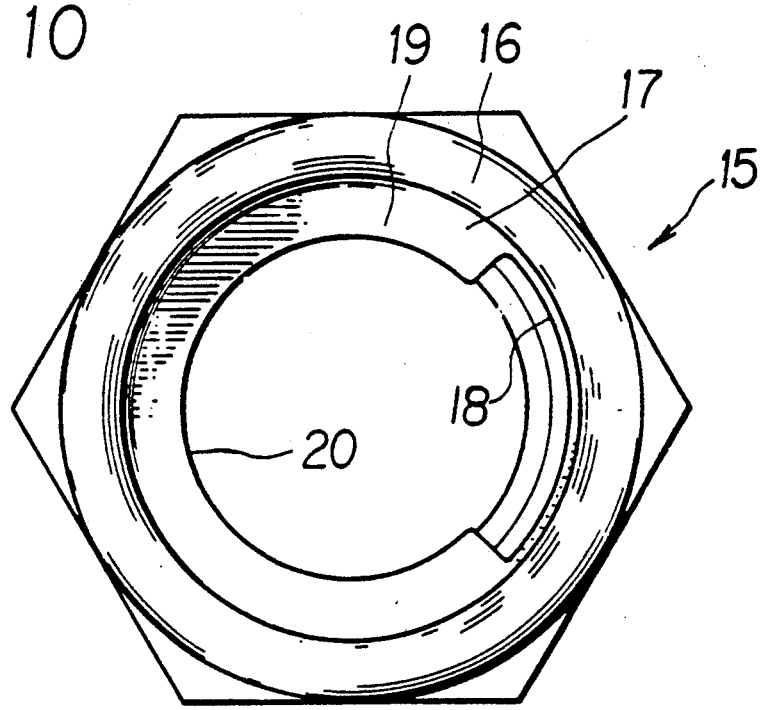
Figure 11:
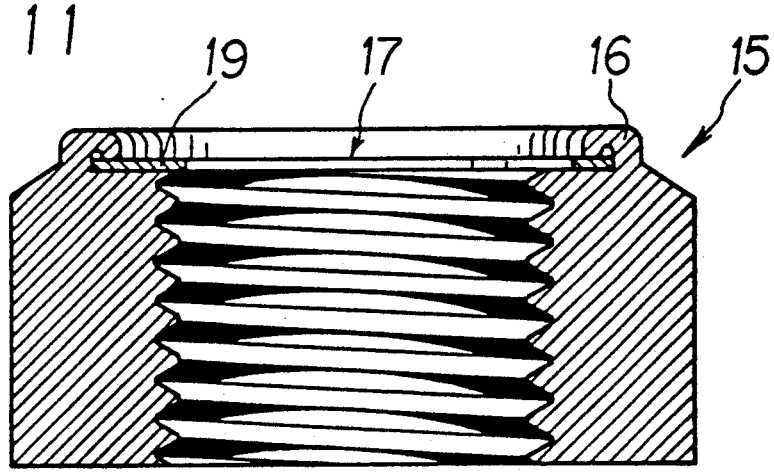
Figure 12:
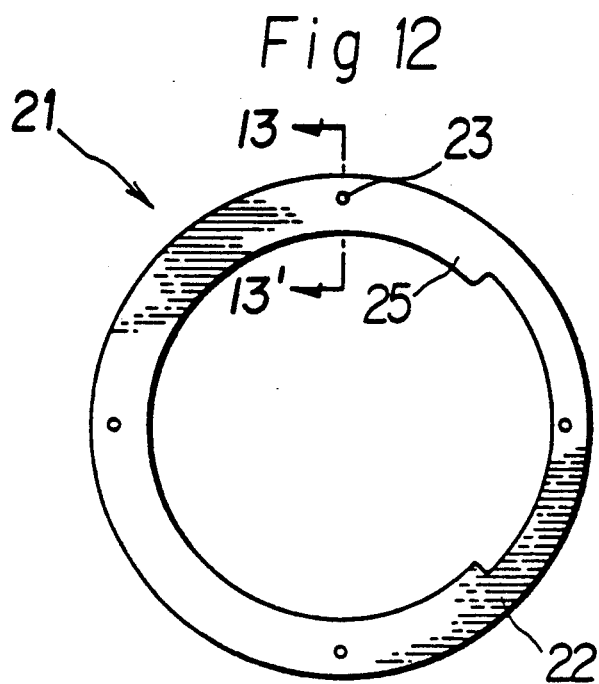
Figure 13:
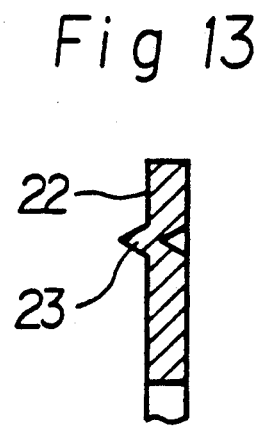
Figure 14:
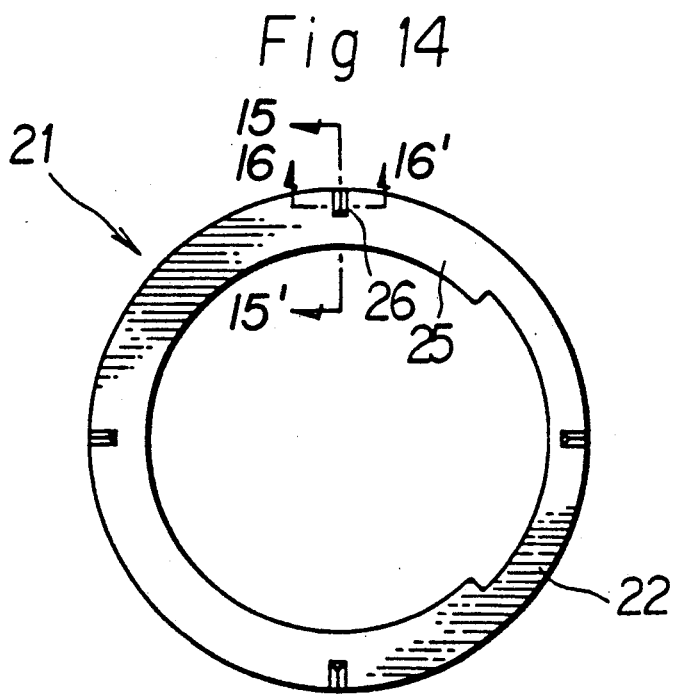
Figure 15:
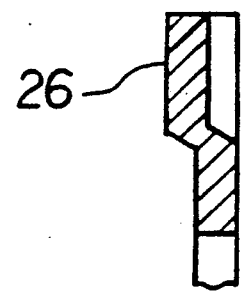
Figure 16:
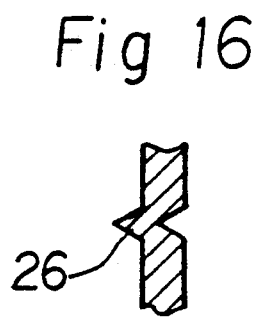
Figure 17:
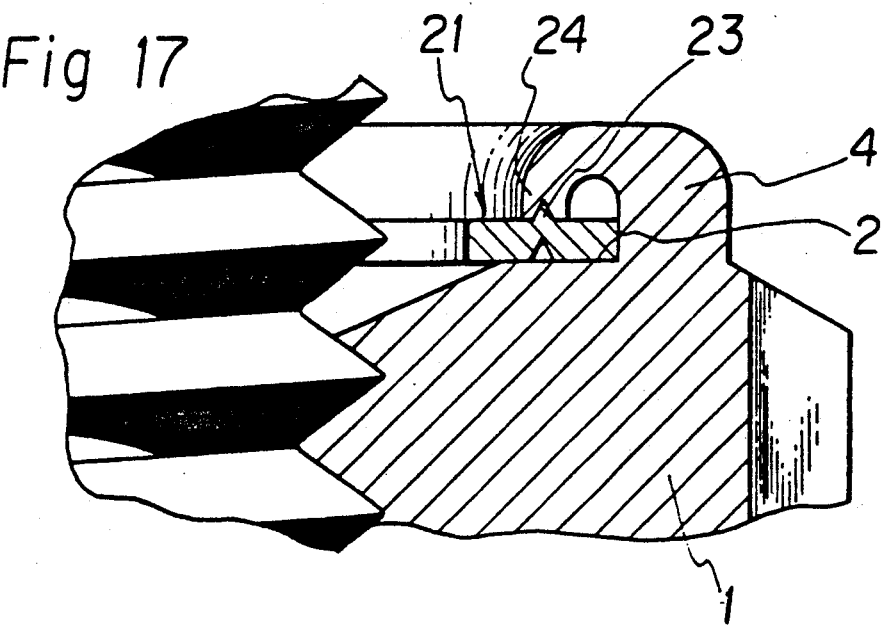
Figure 18:
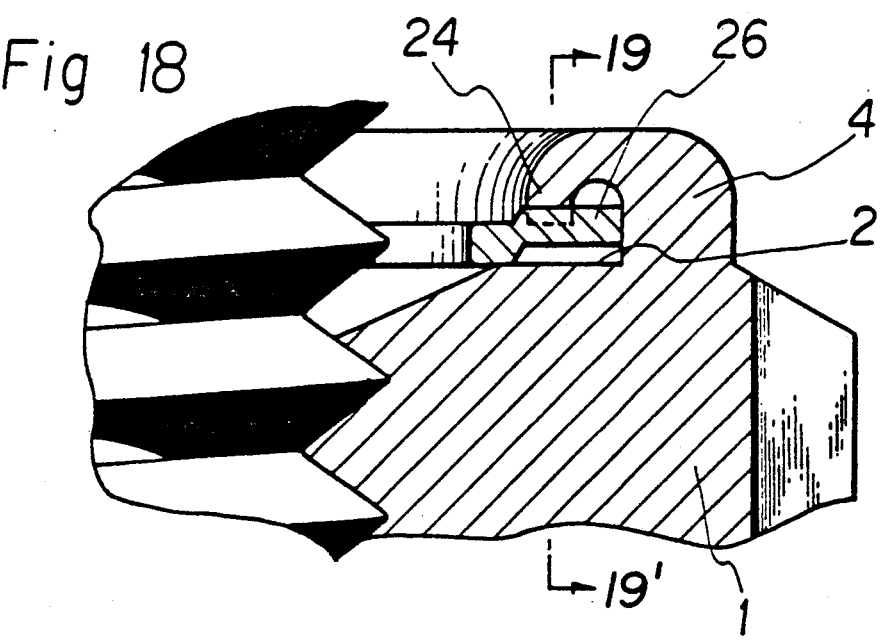
Figure 19:
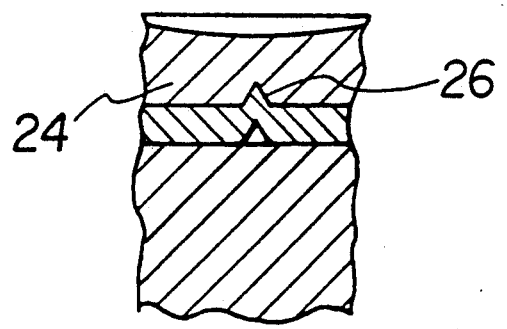

This invention is to be described by way of preferable embodiments referring to the accompanying drawings, wherein FIG. 1 is an upper plan view of a lock nut according to this invention, FIG. 2 is a bottom view of the lock nut according to this invention, FIG. 3 is a front elevational view of the lock nut according to this invention, FIG. 4 is a cross sectional view taken along line 4—4 in FIG. 1, FIG. 5 is an upper plan view for another embodiment according to this invention, FIG. 6 is an upper plan view of an annular flat plate, FIG. 7 is a front cross sectional view of the annular flat plate, FIG. 8 is an explanatory cross sectional view, of the lock nut according to this invention when it is screwed with a male thread member, FIG. 9 is an explanatory cross sectional view for another embodiment of the annular flat plate, FIG. 10 is an upper plan view for still another embodiment of the lock nut according to this invention, FIG. 11 is a front cross sectional view of the lock nut shown in FIG. 10, FIG. 12 is a plan view showing another embodiment of the annular flat plate, FIG. 13 is an enlarged cross sectional view taken along line 13—13 in FIG. 12, FIG. 14 is a plan view showing a further embodiment different from the annular flat plate in FIG. 12, FIG. 15 is an enlarged cross sectional view taken along line 15—15 in FIG. 14, FIG. 16 is an enlarged cross sectional view taken along line 16—16 in FIG. 14, FIG. 17 is an explanatory cross sectional view of a part of the annular flat plate shown in FIG. 12 where it is secured on one surface of the nut, and the nut is screwed on a male thread member, FIG. 18 is an explanatory cross sectional view of a part of the annular flat plate shown in FIG. 14 where it is secured on one surface of the nut, and the nut is screwed on a male thread member, and FIG. 19 is a cross sectional view taken along line 19—19' in FIG. 18.

As shown in FIG. 1 to FIG. 4, the lock nut according to this invention comprises a round nut 1 and an annular flat plate 3 abutted against the upper surface 2 thereof, the annular flat plate 3 being secured between the upper surface 2 and the cylindrical portion 4 of the nut by means of caulking a cylindrical portion 4 projected from the upper portion of the nut 1 inwardly and downwardly.

The round nut 1 is symmetrically formed at its outer circumference with four axially extended cut away grooves 5 in which an appropriate tool is positioned to screw the nut 1 to the male thread formed on a thread member such as a bolt or a shaft.

The annular flat plate 3, is formed with material having high yield point, for example, sheet metal for spring such as high carbon steel, stainless steel and phosphor bronze. As shown in FIG. 6 and FIG. 7, the annular flat plate 3 comprises an annular circumferential periphery 6 and an arcuate protrusion 7 extended inwardly and integrally from the circumferential periphery 6, and the circumferential periphery 6 is held between the upper surface 2 and the cylindrical portion 4 of the nut. The arcuate protrusion 7 is protruded from the portion substantially corresponding to ¾ of the inner circumference of the periphery 6 to the center P for the periphery 6. That is, the arcuate projection 7 of about 270° angle is formed. The inner diameter of the arcuate protrusion 7 is substantially equal to the root diameter of the male thread 8 on a thread member B to which the nut 1 is screwed. Accordingly, the top end 9 of the protrusion 7 is protruded slightly inward of the top of the crest of the female thread 10 on the nut 1. As shown in FIG. 8, the top end 9 may be rounded to be fitted with the root 11 of the male thread 8 and it is preferred to set the length of the protrusion 7 to such an extent as the arcuate protrusion 7 slightly deflects upon contact of the top end 9 to the root 11.

In FIG. 8, the lock nut is shown to include a cylindrical portion (16) having first (56), second (57) and third (58) portions, the first portion having first (59) and second (60) ends, the first end of the first portion being integrally connected to the first end of the circular nut body (61) near the outer periphery of the annular surface of the first end (64) of the nut body (61) and extending from the annular surface of the first end of the nut body in an axial direction from the body, the second portion (56) having an inverted "U" shape, and having first (62) and second (63) ends, the first end of the second portion being integrally connected to the second end of the first portion, bending inwardly from the second end of the first portion toward the center of the circular nut body (61), the third portion (58) having first (65) and second (66) ends, the first end of the third portion (58) being integrally connected to the second end of the second portion and extending from the second end of the second portion in an axial direction toward the nut body.

The female thread 10 of the nut 1 terminates adjacent the upper surface 2 and it is preferred to position the protrusion 7 of the annular flat plate 3 in association with the terminating point. Specifically, one corner 7a of the protrusion is positioned at a point moved adversely to the forwarding direction of the spiral of the female thread 10 by 90° from the terminating point. The protrusion 7 has an arc of 270° angle beginning from the corner 7a and terminating at the other corner 7b. FIG. 1 shows a female thread 10 with right hand thread.

Upon screw-engagement of the lock nut 1 having the foregoing constitution with the thread member B, the top end 9 of the arcuate protrusion 7 is fitted to the flank surface or root 11 of the male thread 8, whereby the arcuate protrusion 7 is deformed elastically and contacts firmly the flank surface of the male thread 8, and the top end 9 of the protrusion 7 eccentrically presses the flank surface of the thread member B inwardly in the radial direction, as well as downwardly in the axial direction.

In addition, since the arcuate protrusion 7 is extended from the portion corresponding to ¾ of the inner circumference of the circumferential periphery 6, the protrusion 7 firmly comes into contact with the threaded surface corresponding to ¾ pitch of the male thread 8. Further, since the arcuate protrusion 7 is formed asymmetrically, the annular flat plate 3 is screwed eccentrically with the male thread 8 and the female thread 10 of the nut 1 also causes interference on the male thread 8 to set the nut 1 to the thread member B in an eccentric state, so that the plate 3 securely prevents the nut 1 from loosening.

The lock nut 1 having the foregoing constitution can be used, particularly for setting the rolling bearing on a shaft. The shaft is formed, at its circumferential surface, with a male thread 8 having a small thread pitch for setting the rolling bearing properly. Correspondingly, the female thread 10 formed on the inner circumferential surface of the lock nut 1 also has a small thread pitch. The annular flat plate 3 has at its inner circumference with the arcuate protrusion 7 of about 270° angle, and the top end 9 of the protrusion 7 is formed such that it firmly contacts to the threaded surface of the male thread 8 on the shaft and applies interference pressure on the threaded surface. Consequently, upon screw-engagement of the round nut 1 to the shaft having the male thread 8, the plate 3 securely prevents the nut 1 from being loosened due to the rotations and the vibrations of the shaft, so that the nut 1 securely fixes the rolling bearing mounted on the shaft.

The arcuate protrusion formed on the annular flat plate 3 is not necessarily limited only to the arc of 270° angle but it may be extended inwardly from the portion corresponding to one-half or more of the inner circumference of the circumferential periphery 6. As shown in FIG. 5, an arcuate protrusion 7' having 180° angle may be formed to the annular flat plate.

The arcuate protrusion 7 with 270° angle is formed to the annular flat plate 3 in the case where the nut has a low-pitched thread, for example, a fine thread or an extra fine thread. Alternatively, the arcuate protrusion 7' with 180° angle is formed to the annular flat plate 3 in the case where the nut has a high-pitched thread, for example, a coarse thread. Accordingly, the protrusion 7 or 7' deforms elastically but not plastically upon screw-engagement of the lock nut 1 with the thread member, for example, a shaft having a male thread or a bolt.

Since the annular flat plate 2 is formed with resilient material such as sheet metal for spring, if the arc width is suitably selected depending upon the thread pitch, the arcuate protrusion 4 is deformed always within the limit of elasticity and the interferring pressure thereof will not be reduced even after repeated screw-engagement of the lock nut with the thread member.

In addition, the sheet metal for spring used for the annular flat plate is made of a spring steel possessed a high strength and the sheet metal for spring usually has higher hardness than the member of the male thread.

Accordingly, the threaded surface of the male thread member is not damaged if it is heat-treated upon screw-engagement of the lock nut according to this invention with the male thread member, while the threaded surface of the male thread member not applied with the heat treatment tends to be damaged easily upon screw-engagement of the lock nut according to this invention with the male thread member. In such a case, as shown in FIG. 9, a contacting member 13 made of soft metal, rubber or plastic may be secured to the top end 12 of the arcuate protrusion 7 or 7' of the annular flat plate 3, wherein the protruding length of the protrusion 7 or 7' is set to such an extent as the contacting member 13 slightly contacts to the root 11 of the male thread 8. As the result, the threaded surface of the male thread member made of a soft material can be prevented from being damaged.

The lock nut according to this invention may be formed, in addition to the foregoing round shape, to various other configurations such as a square nut or a hexagon nut. For example, it may be formed into a hexagon nut 15 as shown in FIG. 10 and FIG. 11. The hexagon nut 15 is formed at the upper portion thereof with a cylindrical portion 16 in which an annular flat plate 17 is secured by caulking said portion 16, and an arcuate protrusion 19 is formed to the inner circumference 18 of the annular flat plate 17 in the same manner as stated previously. In a case where the hexagon nut 15 has, for example, a fine thread, since the thread pitch formed to the thread member such as a bolt is small, an arcuate protrusion 19 is protruded from the portion corresponding to about ¾ of the inner circumference 18 of the annular flat plate 17, and the top end 20 of the protrusion 19 is formed so as to contact to the flank surface or the root of the thread of the thread member.

The hexagon nut 15 having such a constitution is screwed with the male thread formed on the thread member and can surely set an article to be fastened disposed between the nut 15 and the thread member, whereby the hexagon nut 15 is prevented from being loosened due to the vibrations of the fastened article.

The annular flat plate may be formed as an annular flat plate 21 as shown in FIG. 12 to FIG. 16. The annular flat plate 21 is substantially similar to the annular flat plate 7 or 17 described before. But the annular flat plate 21 shown in FIG. 12 has projections 23 on the circumferential periphery 22. It is preferred to provide a plurality of projections 23 symmetrically on the circumferential periphery 22.

Upon securing of the annular flat plate 21 between the upper surface 2 and the cylindrical portion 4 of the nut by the caulking of the cylindrical portion 4, the projections 23 are enforced into the top end portion 24 of the cylindrical portion 4 so that the projections 23 are engaged with the top and portion 24 as shown in FIG. 17. Accordingly, the annular flat plate 21 can surely be secured between the upper surface 2 and the cylindrical portion 4 of the nut to more surely prevent the annular flat plate 21 from sliding movement relative to the nut 1.

The annular flat plate 21 has a single arcuate protrusion 25 of a large surface area and receives considerably great rotational force from the male thread member B upon screw-engagement of the nut 1 with the male thread member B, but since the annular flat plate 21 has the projections 23, the plate 21 does not cause sliding movement relative to the nut 1.

The annular flat plate 21 shown in FIG. 14 has projections 26 on the circumferential periphery 22, in which a plurality of projections 26 are, preferably, extended radially on the circumferential periphery 22 and formed symmetrically thereon.

When the annular flat plate 21 is secured between the upper surface 2 and the cylindrical portion 4 of the nut 1 by the caulking of the cylindrical portion 4, the projections 26 are enforced into the top end portion 24 of the cylindrical portion 4 as shown in FIG. 18 and FIG. 19. Consequently, the annular flat plate 21 is secured between the upper surface 2 and the cylindrical portion 4, whereby the relative sliding movement of the annular flat plate 21 to the nut 1 can be prevented.

Should the annular flat plate 21 move relatively to the nut 1 upon screw-engagement of the nut 1 with the male screw member B, the locking effect of the lock nut 1 would be decreased substantially. Since the projections 23 or 26 are provided to the annular flat plate 21, the relative sliding movement of the annular flat plate 21 to the nut 1 can surely be prevented, whereby the locking effect of the lock nut 1 can be ensured.

Such projections 23 or 26 may be provided on the circumferential periphery 6 of the annular flat plate 3 or on the circumferential periphery of the annular flat plate 17.

What is claimed is:

1. A lock nut for reliably and securely setting bearings mounted on a threaded shaft, said nut comprising:

a circular nut body having an outer peripheral surface, said body having first and second ends, said first and second ends having an annular surface, and said body having internal female threads being at least one of fine and extra fine pitch;

groove means for facilitating rotation of said nut body, adapted for rotation by a tool, said groove means being formed on said peripheral surface of said nut body at the outer circumference of said body;

a cylindrical portion having first, second and third portions, said first portion having first and second ends, said first end of said first portion being integrally connected to said first end of said body near the outer periphery of said annular surface of said first end of said nut body and extending from said annular surface of said first end of said nut body in an axial direction from said body, said second portion having an inverted "U" shape, and having first and second ends, said first end of said second portion being integrally connected to said second end of said first portion, bending inwardly from said second end of said first portion toward the center of said circular nut body, said third portion having first and second ends, said first end of said third portion being integrally connected to said second end of said second portion and extending from said second end of said second portion in an axial direction toward said nut body; and an annular apertured flat sheet formed of resilient material, said annular flat sheet having an inner and outer circumferential periphery, said outer circumferential periphery of said sheet being secured on said annular surface of said first end of said nut body by said third portion pressing said periphery of said annular flat sheet on said annular surface of said first end of said nut body, said sheet having an integral arcuate protrusion extending inwardly from said inner circumferential periphery of said sheet, said arcuate protrusion being greater than or equal to 50% and less than or equal to 75% of said inner circumference so as to be adapted to contact the surface of the male threads on said threaded shaft onto which said nut is screwed, and said arcuate protrusion being fixedly secured relative to said nut body such that said sheet rotates about said threaded shaft with said nut body.

2. A lock nut according to claim 1, in which said arcuate protrusion is defined by an arc concentric with the outer circumferential periphery of said annular flat sheet.

3. A lock nut according to claim 2, in which said arcuate protrusion has an outer surface facing away from said second end of said circular nut body and slightly contacting the root of said male thread.

4. A lock nut according to claim 3, in which said annular flat sheet is made of sheet metal for resilience.

5. A lock nut according to claim 4, in which said inner circumferential periphery of said arcuate protrusion is rounded enabling it to be fitted to the root of said male thread.

6. A lock nut according to claim 2, in which:
said annular flat sheet is made of sheet metal for resilience;
a soft contacting member is secured to the inner circumference of said arcuate protrusion of said annular flat sheet; and
said arcuate protrusion slightly contacts the root of said male threads.

7. A lock nut according to claim 3, in which said annular flat sheet is made of sheet metal for resilience, and the outer circumferential periphery of said annular flat sheet is provided with means for preventing a sliding movement of said annular flat sheet relative to said nut body.

8. A lock nut according to claim 1 wherein said arcuate protrusion has a leading edge which is positioned at a point trailing the point of termination of said female thread by 90°.

9. A lock nut according to claim 7, in which said preventing means includes a plurality of projections provided on the surface of said annular flat sheet and said second end of said third portion contacts with said plurality of projections so as to prevent said annular flat sheet from rotating relative to said nut body.

10. A lock nut according to claim 9, in which said plurality of projections are formed in dot-shapes on one surface of said annular flat sheet near said outer circumferential periphery and a plurality of recesses are formed in shapes corresponding to those of said plurality of projections on a reverse surface of said sheet, near said outer circumferential periphery, and disposed at positions corresponding to those of said plurality of projections respectively.

11. A lock nut according to claim 9, in which said plurality of projections are formed in line-shapes on one surface of said annular flat sheet near said outer circumferential periphery and a plurality of recesses are formed in shapes corresponding to those of said plurality of projections on a reverse surface of said sheet, near said outer circumferential periphery, and disposed at positions corresponding to those of said plurality of projections respectively.

12. A lock nut for reliably and securely setting bearings mounted on a threaded shaft, said nut comprising:
a circular nut body having an outer peripheral surface, said body having first and second ends, said first and second ends having an annular surface, and said body having internal female threads being at least one of fine and extra fine pitch;
groove means for facilitating rotation of said nut body, adapted for rotation by a tool, said groove means being formed on said peripheral surface of said nut body at the outer circumference of said nut body;
a cylindrical portion having first, second and third portions, said first portion having first and second ends, said first end of said first portion being integrally connected to said first end of said body near the outer periphery of said annular surface of said first end of said nut body and extending from said annular surface of said first end of said nut body in an axial direction from said body, said second portion having an inverted "U" shape, and having first and second ends, said first end of said second portion being integrally connected to said second end of said first portion, bending inwardly from said second end of said first portion toward the center of said circular nut body, said third portion having first and second ends, said first end of said third portion being integrally connected to said second end of said second portion and extending from said second end of said second portion in an axial direction toward said nut body;
an annular apertured flat sheet formed of resilient material, said annular flat sheet having an inner and outer circumferential periphery, said outer circumferential periphery of said sheet being secured on said first end surface of said nut body by said third portion pressing said periphery of said annular flat sheet on said annular surface of said first end of said nut body, said sheet having an integral arcuate protrusion extending inwardly from said inner circumferential periphery of said sheet, said arcuate protrusion being greater than or equal to 50% and less than or equal to 75% of said inner circumference so as to be adapted to contact the surface of the male threads on said threaded shaft onto which said nut is screwed, and said arcuate protrusion being fixedly secured relative to said nut body such that said sheet rotates about said threaded shaft with said nut body; and
a plurality of projections formed integrally with a surface of said annular flat sheet, near said outer circumferential periphery of said sheet, said projections being aligned and engaged with said second end of said third portion, said outer circumferential periphery of said sheet being held between said first surface of said nut body and said second end of said third portion.

13. A lock nut according to claim 12, in which:
said annular flat sheet is made of sheet metal for resilience;
a soft contacting member is secured to the inner circumferential periphery of said arcuate protrusion of said annular flat sheet; and
said arcuate protrusion slightly contacts the root of said male threads.

14. A lock nut according to claim 12, wherein said arcuate protrusion has a leading edge which is positioned at a point trailing the point of termination of the female thread by 90°.

15. A lock nut according to claim 12, in which said plurality of projections are formed in dot-shapes on one surface of said annular flat sheet near said outer circumferential periphery and a plurality of recesses are formed in shapes corresponding to those of said plurality of projections on a reverse surface of said sheet, near said outer circumferential periphery, and disposed at positions corresponding to those of said plurality of projections respectively.

16. A lock nut according to claim 12, in which said plurality of projections are formed in line-shapes on one surface of said annular flat sheet near said outer circumferential periphery and a plurality of recesses are formed in shapes corresponding to those of said plurality of projections on a reverse surface of said sheet, near said outer circumferential periphery, and disposed at positions corresponding to those of said plurality of projections respectively.

17. A lock nut for reliably and securely setting bearings mounted on a threaded shaft, said nut comprising:
a circular nut body having an outer peripheral surface, said body having first and second ends, said first and second ends having an annular surface, and said body having internal female threads being at least one of fine and extra fine pitch;
groove means for facilitating rotation of said nut body, adapted for rotation by a tool, said groove means being formed on said peripheral surface of said nut body at the outer circumference of said body;
a cylindrical portion having first, second and third portions, said first portion being integrally connected at a first end thereof to said first end of said body near the outer periphery of said annular surface of said first end of said nut body, extending from said annular surface of said first end of said nut body in an axial direction from said body and terminating at a second end thereof, said second portion being integrally connected at a first end thereof to said second end of said first portion, bending inwardly from said second end of said first portion toward the center of said circular nut body and terminating at a second end thereof, thereby said second portion is formed in an inverted "U" shape, said third portion being integrally connected at a first end thereof to said second end of said second portion, extending from said second end of said second portion in an axial direction toward said nut body and terminating at a second end thereof which is a free end, and
an annular apertured flat sheet formed of resilient material, said annular flat sheet having an inner and outer circumferential periphery, said outer circumferential periphery of said sheet being secured on said annular surface of said first end of said nut body by said third portion pressing said periphery of said annular flat sheet on said annular surface of said first end of said nut body, said sheet having an integral arcuate protrusion extending inwardly from said inner circumferential periphery of said sheet, said arcuate protrusion being greater than or equal to 50% and less than or equal to 75% of said inner circumference so as to be adapted to contact the surface of the male threads on said threaded shaft onto which said nut is screwed, and said arcuate protrusion being fixedly secured relative to said nut body such that said sheet rotates about said threaded shaft with said nut body.

18. A lock nut according to claim 17, in which said arcuate protrusion is defined by an arc concentric with the outer circumferential periphery of said annular flat sheet.

19. A lock nut according to claim 18, in which said arcuate protrusion has an outer surface facing away said second end of said circular nut body and slightly contacting the root of said male thread.

20. A lock nut according to claim 19, in which said annular flat sheet is made of sheet metal for resilience.

21. A lock nut according to claim 20, in which said inner circumference periphery of said arcuate protrusion is rounded enabling it to be fitted to root of said male thread.

22. A lock nut according to claim 18, in which:
said annular flat sheet is made of sheet metal for resilience;
a soft contacting member is secured to the inner circumference of said arcuate protrusion of said annular flat sheet; and
said arcuate protrusion slightly contacts the root of said male threads.

23. A lock nut according to claim 19, in which annular flat sheet is made of sheet metal for resilience, and the outer circumferential periphery of said annular flat sheet is provided with means for preventing a sliding movement of said annular flat sheet relative to said nut body.

24. A lock nut according to claim 17 wherein said arcuate protrusion has a leading edge which is positioned at a point trailing the point of termination of said female thread by 90°.

25. A lock nut according to claim 23, in which said preventing means includes a generally of projections provided on the surface of said annular flat sheet and said second end of said third portion contacts with said plurality of projections so as to prevent said annular flat sheet from rotating relative to said nut body.

26. A lock nut according to claim 25, in which said plurality of projections are formed in dot-shapes on one surface of said annular flat sheet near said outer circumferential periphery and a plurality of recesses are formed in shapes corresponding to those of said plurality of projections on a reverse surface of said sheet, near said outer circumferential periphery, and disposed at positions corresponding to those of said plurality of projections respectively.

27. A lock nut according to claim 25, in which said plurality of projections are formed in line-shapes on one surface of said annular flat sheet near said outer circumferential periphery and a plurality of recesses are formed in shapes corresponding to those of said plurality of projections on a reverse surface of said sheet, near said outer circumferential periphery, and disposed at positions corresponding to those of said plurality of projections respectively.

28. A lock nut for reliably and securely setting bearings mounted on a threaded shaft, said nut comprising:
a circular nut body having an outer peripheral surface, said body having first and second ends, said first and second ends having an annular surface, and said body having internal female threads being at least one of fine and extra fine pitch;
groove means for facilitating rotation of said nut body, adapted for rotation by a tool, said groove means being formed on said peripheral surface of said nut body at the outer circumference of said body;
a cylindrical portion having first, second and third portions, said first portion being integrally connected at a first end thereof to said first end of said body near the outer periphery of said annular surface of said first end of said nut body and extending from said annular surface of said first end of said nut body in an axial direction from said body, said second portion being integrally connected at a first end thereof to said second end of said first portion, bending inwardly from said second end of said first portion toward the center of said circular nut body and terminating at a second end thereof, thereby said second portion being formed in an inverted "U" shape, said third portion being integrally connected at a first end thereof to said second end of said second portion, said third portion extending from said second end of said second portion in an axial direction toward said nut body and terminating at said second end thereof which is free end;

an annular apertured flat sheet formed of resilient material, said annular flat sheet having an inner and outer circumferential periphery, said outer circumferential periphery of said sheet being secured on said first end surface of said nut body by said third portion pressing said periphery of said annular flat sheet on said annular surface of said first end of said nut body, said sheet having an integral arcuate protrusion extending inwardly from said inner circumferential periphery of said sheet, said arcuate protrusion being greater than or equal to 50% and less than or equal to 75% of said inner circumference so as to be adapted to contact the surface of the male threads on said threaded shaft onto which said nut is screwed, and said arcuate protrusion being fixedly secured relative to said nut body such that said sheet rotates about said threaded shaft with said nut body; and a plurality of projections formed integrally with a surface of said annular flat sheet, near said outer circumferential periphery of said sheet, said projections being aligned and in contact with said second end of said third portion, said outer circumferential periphery of said sheet being held between said first surface of said nut body and said second end of said third portion, said plurality of projections each being formed in line-shape on one surface of said annular flat sheet opposing to said second end of said third portion and radically extending to an extreme outer circumferential periphery of said sheet and having a top ridge line which also radially extends to said extreme outer circumferential periphery and terminates at the same, and a plurality of recesses are formed in shapes corresponding to those of said plurality of projections on a reverse surface of said sheet, and disposed at positions corresponding to those of said plurality of projections respectively, said plurality of recesses each radially extending to said extreme outer circumferential periphery and radially opening at same into the outside of the sheet, and having a circumferential periphery and terminates at the same.

29. A lock nut according to claim 28, wherein said annular flat sheet is made of sheet metal for resilience;

a soft contacting member is secured to the inner circumferential periphery of said arcuate protrusion of said annular flat sheet; and said arcuate protrusion slightly contacts the root of said male threads.

30. A lock nut according to claim 28, wherein said arcuate protrusion has a leading edge which is positioned at a point trailing the point of termination of the female thread by 90°.

* * * * *